US010681237B2

(12) United States Patent
Okuma

(10) Patent No.: US 10,681,237 B2
(45) Date of Patent: Jun. 9, 2020

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Satoshi Okuma, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/191,149

(22) Filed: Nov. 14, 2018

(65) Prior Publication Data

US 2019/0158685 A1 May 23, 2019

(30) Foreign Application Priority Data

Nov. 21, 2017 (JP) ................................ 2017-223660

(51) Int. Cl.
*H04N 1/00* (2006.01)
*G06F 3/12* (2006.01)

(52) U.S. Cl.
CPC ......... *H04N 1/0097* (2013.01); *G06F 3/1204* (2013.01); *G06F 3/1257* (2013.01); *H04N 1/00474* (2013.01)

(58) Field of Classification Search
CPC .............. H04N 1/0097; H04N 1/00474; G06F 3/1204; G06F 3/1257
USPC ......................................................... 358/1.13
See application file for complete search history.

(56) References Cited

U.S. PATENT DOCUMENTS

2006/0235896 A1* 10/2006 Matoba .............. H04N 1/00474
2011/0043845 A1* 2/2011 Nakagawa ......... H04N 1/00411 358/1.13
2014/0078538 A1* 3/2014 Morikawa .......... H04N 1/00233 358/1.13
2015/0347739 A1* 12/2015 Matsushima ........... G06F 21/34 726/20
2016/0124686 A1* 5/2016 Maeda .................. G06F 3/1204 358/1.14
2016/0274807 A1* 9/2016 Miyahara ............. G06F 3/0619
2016/0283169 A1* 9/2016 Okada ................... G06F 3/1205
2016/0309057 A1* 10/2016 Kawakami ........... H04N 1/4413
2017/0046105 A1* 2/2017 Masui ................... G06F 3/1225
2017/0257525 A1* 9/2017 Noda ................ H04N 1/32122
2018/0084143 A1* 3/2018 Mori ................. H04N 1/00928

FOREIGN PATENT DOCUMENTS

JP 2013-232071 A 11/2013

* cited by examiner

*Primary Examiner* — Allen H Nguyen
(74) *Attorney, Agent, or Firm* — Canon U.S.A., Inc. IP Division

(57) ABSTRACT

An information processing apparatus includes an acceptance unit configured to accept a first operation for giving an instruction related to a function assigned to hardware and a second operation for giving an instruction related to a function assigned to software, an instruction identification unit configured to identify an instruction content corresponding to the first operation and the second operation based on the first operation and the second operation when the acceptance unit accepts the second operation after accepting the first operation, and a storage unit configured to store, in a storage unit, the instruction content identified by the instruction identification unit, an operation log of the first operation, and an operation log of the second operation in association with each other.

19 Claims, 7 Drawing Sheets

START
S401 IS HARDWARE OPERATED? NO / YES
S402 GENERATE HARDWARE OPERATION LOG
S403 RECORD HARDWARE OPERATION LOG
S404 IS APPLICATION OPERATED? NO / YES
S405 GENERATE APPLICATION OPERATION LOG
S406 RECORD APPLICATION OPERATION LOG IN ASSOCIATION WITH HARDWARE OPERATION LOG
S407 CAN INSTRUCTION CONTENT BE IDENTIFIED? NO / YES
S408 GENERATE INSTRUCTION CONTENT LOG
S409 RECORD INSTRUCTION CONTENT LOG IN ASSOCIATION WITH APPLICATION OPERATION LOG
1

FIG.3

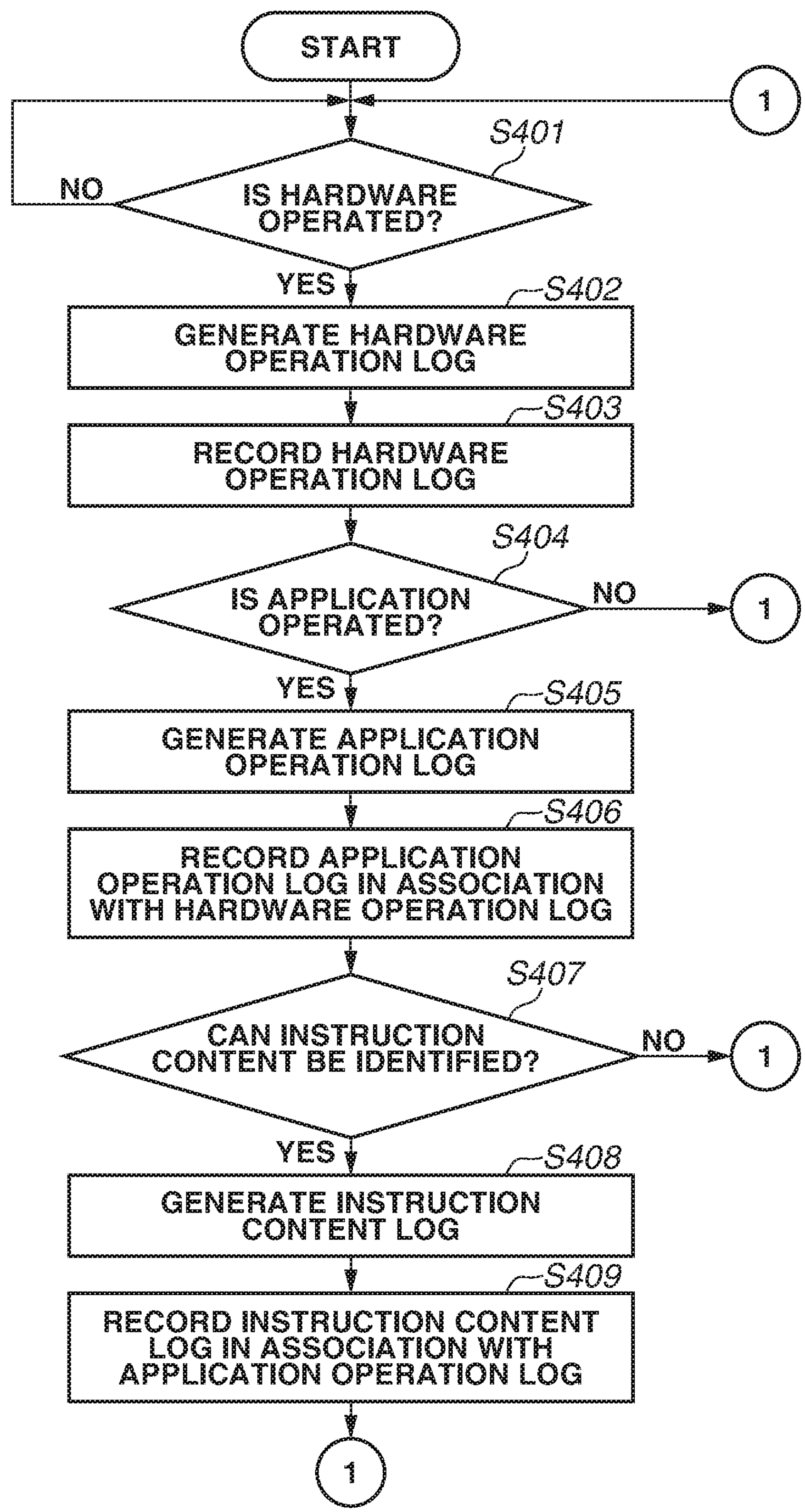
FIG.4
START
1
S401
IS HARDWARE OPERATED?
NO
YES
S402
GENERATE HARDWARE OPERATION LOG
S403
RECORD HARDWARE OPERATION LOG
S404
IS APPLICATION OPERATED?
NO
1
YES
S405
GENERATE APPLICATION OPERATION LOG
S406
RECORD APPLICATION OPERATION LOG IN ASSOCIATION WITH HARDWARE OPERATION LOG
S407
CAN INSTRUCTION CONTENT BE IDENTIFIED?
NO
1
YES
S408
GENERATE INSTRUCTION CONTENT LOG
S409
RECORD INSTRUCTION CONTENT LOG IN ASSOCIATION WITH APPLICATION OPERATION LOG
1

| HARDWARE OPERATION No. | DATE AND TIME | HARDWARE OPERATION ID | ADDITIONAL INFORMATION |
|---|---|---|---|
| HD00001 | 9/13 1:00:00 | touchdown | 120, 300 |
| HD00002 | 9/13 1:00:01 | touchup | 120, 301 |
| HD00003 | 9/13 1:00:10 | touchdown | 200, 300 |
| HD00004 | 9/13 1:00:12 | touchup | 200, 300 |
| HD00005 | 9/13 1:00:18 | touchdown | 390, 200 |
| HD00006 | 9/13 1:00:19 | touchup | 390, 200 |
| HD00007 | 9/13 1:00:20 | touchdown | 400, 320 |
| HD00008 | 9/13 1:00:21 | touchup | 400, 319 |
| HD00009 | 9/13 1:00:30 | keydown | start_key |
| HD00010 | 9/13 1:00:31 | keyup | start_key |
| HD00011 | 9/13 1:00:32 | keydown | start_key |
| HD00012 | 9/13 1:00:33 | keyup | start_key |
| HD00013 | 9/13 1:05:00 | touchdown | 100, 300 |
| HD00014 | 9/13 1:05:01 | touchup | 100, 300 |
| ... | ... | ... | ... |

510

| APPLICATION OPERATION No. | DATE AND TIME | APPLICATION OPERATION ID | ADDITIONAL INFORMATION | HARDWARE OPERATION No. |
|---|---|---|---|---|
| AP00001 | 9/13 1:00:01 | ID_BTN_NUP | SELECT | HD00001, HD00002 |
| AP00002 | 9/13 1:00:12 | ID_BTN_2IN1 | SELECT | HD00003, HD00004 |
| AP00003 | 9/13 1:00:21 | ID_BTN_OK | SELECT | HD00007, HD00008 |
| AP00004 | 9/13 1:00:31 | ID_KEY_START | SELECT | HD00009, HD00010 |
| AP00005 | 9/13 1:05:01 | ID_BTN_PAPER | SELECT | HD00013, HD00014 |
| ... | ... | ... | ... | ... |

520

| INSTRUCTION CONTENT No. | DATE AND TIME | INSTRUCTION CONTENT ID | APPLICATION OPERATION No. |
|---|---|---|---|
| MN00001 | 9/13 1:00:21 | ID_FUNC_NUP | AP00001, AP00002, AP00003 |
| MN00002 | 9/13 1:00:31 | ID_FUNC_START_COPY | AP00004 |
| ... | ... | ... | ... |

| HARDWARE OPERATION No. | DATE AND TIME | HARDWARE OPERATION ID | ADDITIONAL INFORMATION |
|---|---|---|---|
| HD00001 | 9/13 1:00:00 | touchdown | 120, 300 |
| HD00002 | 9/13 1:00:01 | touchup | 120, 301 |
| HD00003 | 9/13 1:00:10 | touchdown | 200, 300 |
| HD00004 | 9/13 1:00:12 | touchup | 200, 300 |
| HD00005 | 9/13 1:00:18 | touchdown | 390, 200 |
| HD00006 | 9/13 1:00:19 | touchup | 390, 200 |
| HD00007 | 9/13 1:00:20 | touchdown | 400, 320 |
| HD00008 | 9/13 1:00:21 | touchup | 400, 319 |
| HD00009 | 9/13 1:00:30 | keydown | start_key |
| HD00010 | 9/13 1:00:31 | keyup | start_key |
| HD00011 | 9/13 1:00:32 | keydown | start_key |
| HD00012 | 9/13 1:00:33 | keyup | start_key |
| HD00013 | 9/13 1:05:00 | touchdown | 100, 300 |
| HD00014 | 9/13 1:05:01 | touchup | 100, 300 |
| ... | ... | ... | ... |

710

| APPLICATION OPERATION No. | DATE AND TIME | APPLICATION OPERATION ID | ADDITIONAL INFORMATION | DISPLAYED SCREEN ID | HARDWARE OPERATION No. |
|---|---|---|---|---|---|
| AP00001 | 9/13 1:00:01 | ID_BTN_NUP | SELECT | ID_DSP_COPYMAIN | HD00001, HD00002 |
| AP00002 | 9/13 1:00:12 | ID_BTN_2IN1 | SELECT | ID_DSP_NUPSET | HD00003, HD00004 |
| AP00003 | 9/13 1:00:21 | ID_BTN_OK | SELECT | ID_DSP_NUPSET | HD00007, HD00008 |
| AP00004 | 9/13 1:00:31 | ID_KEY_START | SELECT | ID_DSP_COPYMAIN | HD00009, HD00010 |
| AP00005 | 9/13 1:05:01 | ID_BTN_PAPER | SELECT | ID_DSP_COPYMAIN | HD00013, HD00014 |
| ... | ... | ... | ... | ... | ... |

720

| INSTRUCTION CONTENT No. | DATE AND TIME | INSTRUCTION CONTENT ID | USER ID | APPLICATION OPERATION No. |
|---|---|---|---|---|
| MN00001 | 9/13 1:00:21 | ID_FUNC_NUP | ID_USER_AAA000001 | AP00001, AP00002, AP00003 |
| MN00002 | 9/13 1:00:31 | ID_FUNC_START_COPY | ID_USER_AAA000001 | AP00004 |
| ... | ... | ... | ... | ... |

INFORMATION PROCESSING APPARATUS, INFORMATION PROCESSING METHOD, AND RECORDING MEDIUM

BACKGROUND

Field

The present disclosure relates to an information processing apparatus, an information processing method, and a recording medium.

Description of the Related Art

With the spread of the Internet of Things (IoT) technology, various data analysis tools are available for performing data analysis using collected data, such as performance logs and operation logs of various devices, in a server. The operation logs of a device may include a record of history of one user's operating instructions to the device. With such information, the number of operations, date and time of each operation, and the like may be analyzed. Results of such data analysis can be used for providing information for improving usability of an operation screen and functionality of the device. Japanese Patent Application Laid-Open No. 2013-232071 discusses a technique for analyzing a more essential intention of a user that does not differ between different types of device. This intention of the user may be generated by estimating an intention of the user's operation based on operation history data and by adding data for identifying an intention of an operation to the operation history data.

In many cases, the operation logs (including the number of operations and the operation time described above) are extracted based on the operation history data of hardware constituting a user interface of a device. Since the operation history can depend on the configuration of the hardware, it is not useful to simply compare operation history data of devices each of which has an operation unit built on different hardware. Rather, the analysis needs to be performed in a manner that sufficiently considers the difference between the device types of different hardware. However, performing such an analysis can require identification of settings made by a user corresponding to a function of the device, and identification of an operation history of hardware corresponding to the settings, and thus such analysis can be very difficult to perform.

SUMMARY OF THE INVENTION

Various embodiments of the present disclosure are directed to an information processing apparatus including an acceptance unit configured to accept a first operation for giving an instruction related to a function assigned to hardware and a second operation for giving an instruction related to a function assigned to software, an instruction identification unit configured to identify an instruction content corresponding to the first operation and the second operation based on the first operation and the second operation when the acceptance unit accepts the second operation after accepting the first operation, and a storage unit configured to store, in a storage unit, the instruction content identified by the instruction identification unit, an operation log of the first operation, and an operation log of the second operation in association with each other.

Further features will become apparent from the following description of exemplary embodiments with reference to the attached drawings.

BRIEF DESCRIPTION OF THE DRAWINGS

FIG. 3 is a diagram illustrating an example of an operation screen in accordance with one embodiment.

FIG. 4 is a flowchart illustrating log recording processing in accordance with one embodiment, FIG. 5 is a diagram illustrating an example of a data structure of log information in accordance with one embodiment.

FIG. 7 is a diagram illustrating an example of a data structure of log information in accordance with one embodiment.

DESCRIPTION OF THE EMBODIMENTS

Exemplary embodiments of the present disclosure will be described below with reference to the drawings.

Figure 1:
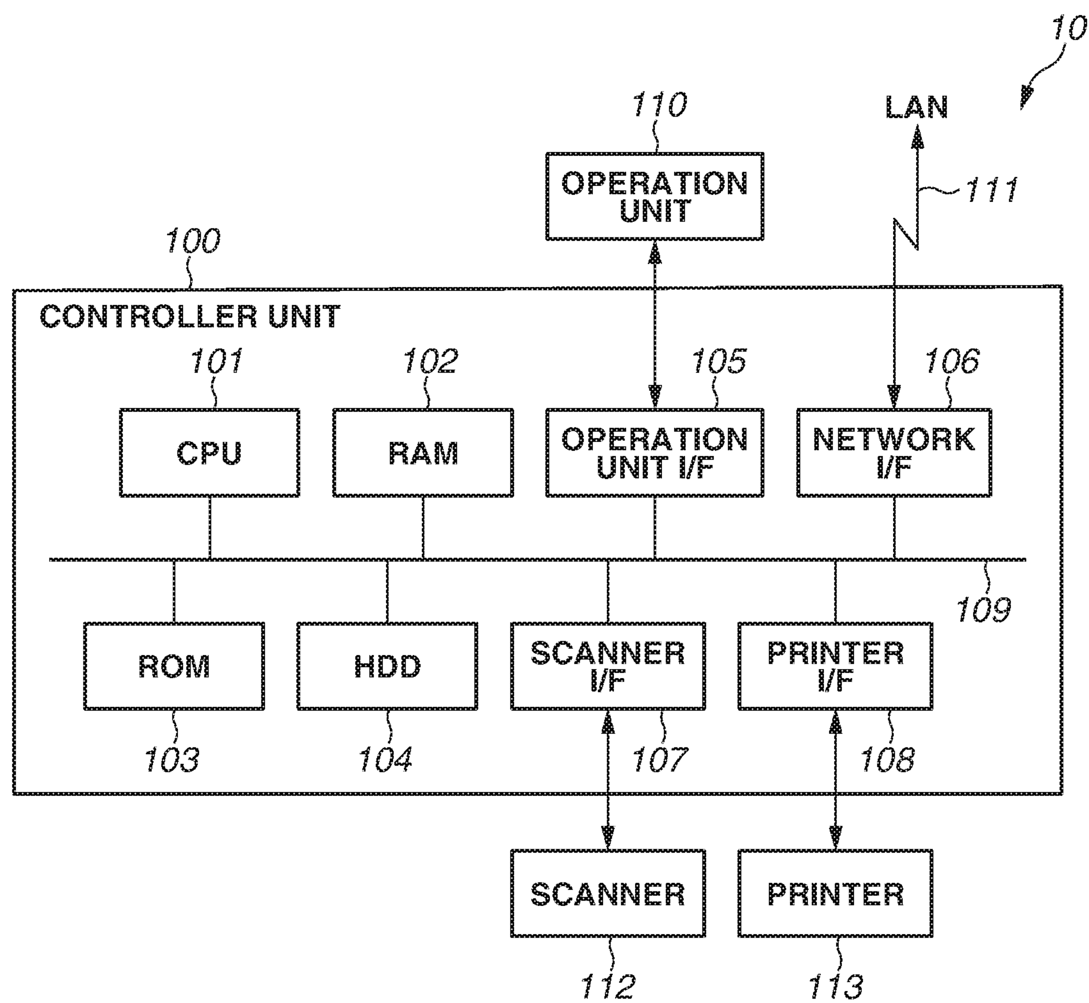
FIG. 1 is a hardware block diagram of a multifunction printer (MFP) in accordance with one embodiment.

FIG. 1 is a hardware block diagram of a multifunction printer (MFP) 10 according to a first exemplary embodiment. Here, the MFP 10 is an example of an information processing apparatus. In the present exemplary embodiment, the MFP 10 will be described as an example of the information processing apparatus, but the information processing apparatus may be any apparatus as long as it executes a function of the apparatus according to a user operation, and is not limited to the exemplary embodiment. As other examples, the information processing apparatus may be a single function printer, an imaging apparatus, or other apparatuses.

The MFP 10 includes a controller unit 100, a scanner 112, and a printer 113. The MFP 10 is connectable to a local area network (LAN) 111. The controller unit 100 includes a central processing unit (CPU) 101 that executes various control programs. The CPU 101 hoots up the MFP 10 according to a boot program stored in a read only memory (ROM) 103. The CPU 101 reads a control program stored in a hard disk drive (HDD) 104 and executes predetermined processing using a random access memory (RAM) 102 as a work area. In the HDD 104, various control programs for functions including copy and print are stored. In addition, scan data read from the scanner 112 is stored in the HDD 104. The functions and processes of the MFP 10 described below are realized when the CPU 101 reads programs stored in the ROM 103 or the HDD 104 and executes the programs.

An operation unit interface (1/F) 105 controls communication to input/output data to/from an operation unit 110. A network I/F 106 is connected to the LAN 111 and controls input/output of information via the LAN 111. A scanner I/F 107 inputs image data from the scanner 112 and inputs/outputs scanner control data. A printer I/F 108 outputs image data to the printer 113 and inputs/outputs printer control data. Each unit of the controller unit 100 is arranged on a system bus 109.

The operation unit 110 is an information display interface for instruction input from a user and for information display to a user that includes an input device such as a touch panel and hardware keys, and a display device such as a liquid crystal display (LCD) or a light emitting diode (LED). The hardware keys include a start button for instructing the MFP 10 to start scan execution of a paper document. The scanner 112 has an optical reading device, such as a charge coupled device (CCD), and optically scans a paper medium to acquire electro image data. The printer 113 has a function of forming an image on a recording medium such as a paper sheet from electronic image data.

When executing processes such as copying or printing, the MFP 10 records the execution result and the like in the HDD 104 as a log. The MFP 10 records a user instruction input from the operation unit 110 via the operation unit I/F 105, and information displayed to a user in the HDD 104 as a log. The MFP 10 can also transmit the logs recorded in the HDD 104 to a device external to the MFP 10 via the network I/F 106. Further, the MFP 10 can display a login screen to allow a user to input a user identification (ID), a password, and the like, and can authenticate a user management function of the MIT 10 or a user management function of an external apparatus based on the input user information. When the MFP 10 determines that correct user information has been input as a result of the authentication, the MFP 10 allows operation on the MFP 10. The MFP 10 moves to the login screen again in response to a logout operation for instructing an end of operation on the MFP 10.

Figure 2:
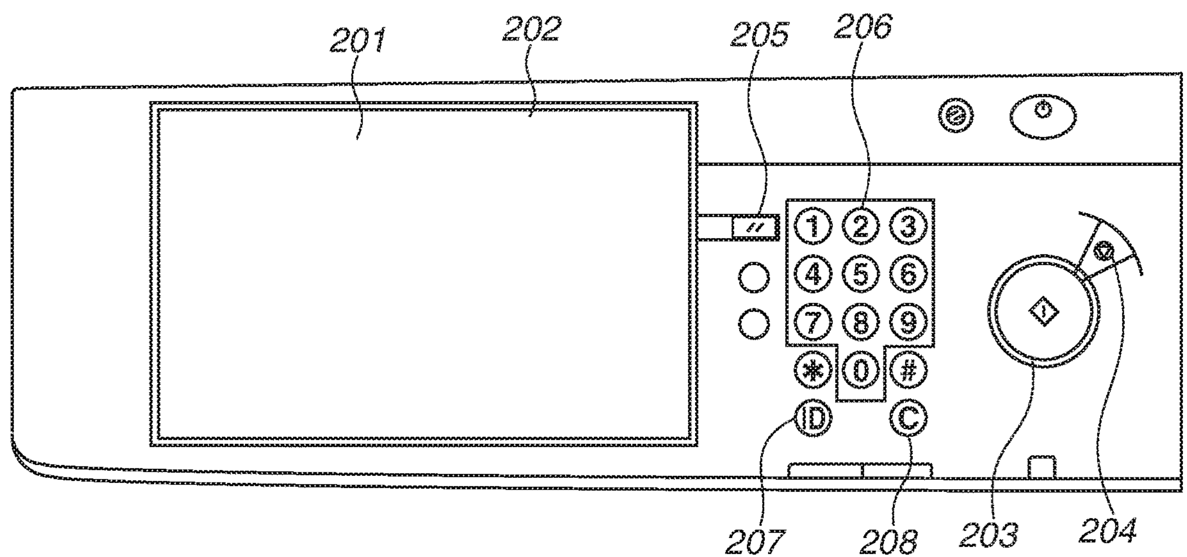
FIG. 2 is an external view of an operation unit in accordance with one embodiment.

FIG. 2 is an external view of the operation unit 110. An LCD panel 202 is a liquid crystal display device having a touch panel 201 on its front, and displays an operation screen for making various settings and displays setting information that has been input. When a user touches an operation object to instruct an operation displayed on the LCD panel 202 via the touch panel 201, the user can give an instruction of various settings. The CPU 101 accepts an instruction corresponding to a user operation based on position relationship between the position on the touch panel 201 where a user touches and the position of the operation object such as a software key displayed on the LCD panel 202.

A start key 203 is a hardware key for instructing the scanner 112 to start scanning of a paper medium. A stop key 204 is a hardware key for instructing the MFP 10 to stop job processing. A reset key 205 is a hardware key for clearing setting values currently set on the setting screen displayed on the LCD panel 202 and returning the setting values to default setting values. A numeric keypad 206 is a hardware key for inputting numerical values such as the number of copies. An ID key 207 is a hardware key for instructing the MFP 10 to perform logout processing by a user logging in to the MFP 10.

Figure 3:
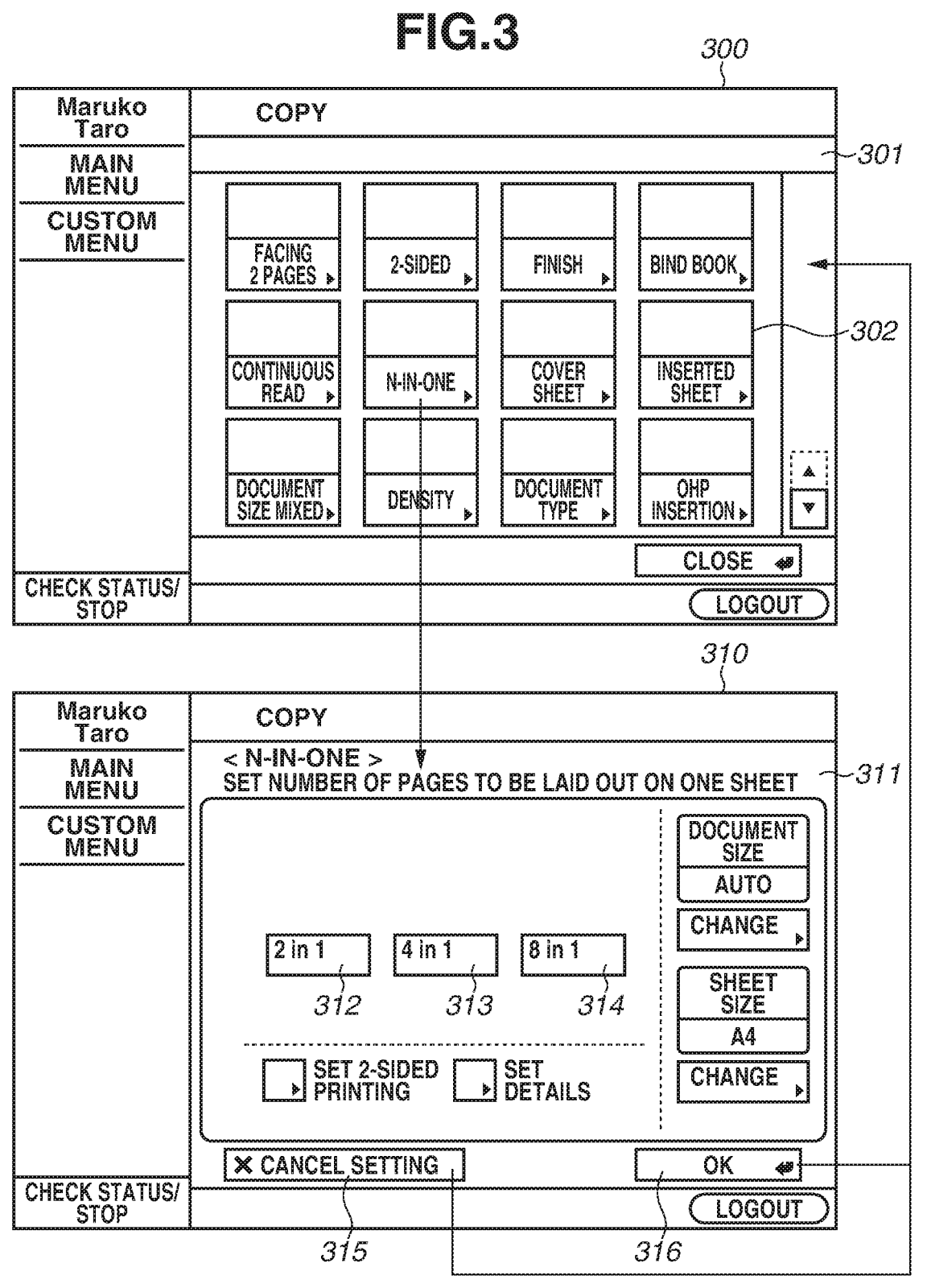

FIG. 3 is a diagram illustrating an example of a copy screen 300. The copy screen 300 is displayed on the LCD panel 202. The copy screen 300 is formed by the CPU 101, and displayed on the LCD panel 202 of the operation unit 110 via the operation unit I/F 105. The copy screen 300 illustrated in FIG. 3 is a screen for making settings relating to the copy function executed by the MFP 10. The copy screen 300 is a screen for selecting various functions in the copy process performed by the MFP 10. In a dialog 301 of the copy screen 300, a plurality of buttons 302 is displayed. The plurality of buttons 302 is a user interface (UI) for shifting a screen to a setting screen for each of the functions for the copy process. For example, when an "N-in-one printing" function button 302 is selected, an N-in-one printing screen 310 is displayed. Note that "N-in-one printing" is a kind of layout printing, and is a function of laying out a plurality of pages of a document having been read by the scanner onto one side of a print sheet and printing the laid-out page.

In a dialog 311 of the N-in-one printing screen 310, a plurality of buttons 312 to 314 is displayed. Each of the buttons 312 to 314 is an UI for setting a function related to N-in-one printing. The button 312 is a button for instructing the MFP 10 to make a setting to lay out and print two pages of a document on one side of a print sheet. The button 313 is a button for instructing the MFP 10 to make a setting to lay out and print four pages on one side. The button 314 is a button for instructing the MFP 10 to make a setting to lay out and print eight pages on one side.

A button 315 is a button for instructing the MFP 10 to make a setting to cancel the setting of the N-in-one printing function itself. When this button is selected, the N-in-one printing function is canceled, and the displayed screen is shifted to the copy screen 300. A button 316 is a button for confirming a setting of the N-in-one printing function. When this button 316 is selected, the value set on the N-in-one printing screen 310 is confirmed, and the displayed screen is shifted to the copy screen 300.

FIG. 4 is a flowchart illustrating log recording processing performed by the MFP 10. The log recording processing is processing to record log information according to a user operation. In the present exemplary embodiment, it is assumed that the log information includes a hardware operation log, an application operation log, and an instruction content log. The hardware operation log, the application operation log, and the instruction content log will be described below.

In step S401, the CPU 101 of the MFP 10 determines whether an operation for making an instruction related to a function assigned to the hardware is performed by a user. Here, the hardware is a UI physically provided and operated by a user. In the MFP 10 of the present exemplary embodiment, for example, a function of displaying a setting screen on the LCD panel 202 is assigned to the touch panel 201 as hardware. Hereinafter, an operation on hardware is referred to as a hardware operation. The CPU 101 determines whether a hardware operation has been performed via the operation unit 11F 105. The CPU 101 waits until the CPU 101 determines that a hardware operation has been performed, and if the CPU 101 determines that a hardware operation has been performed (YES in step S401), the processing proceeds to step S402. The processing in step S401 is an example of an acceptance processing for accepting a hardware operation.

In step S402, the CPU 101 generates information indicating the content of the hardware operation accepted in step S401 as a hardware operation log. Next, in step S403, the CPU 101 records the hardware operation log generated in step S402 in a storage unit such as the HDD 104. In step S404, the CPU 101 determines whether an operation for giving an instruction related to a function assigned to an application has been performed by the user. This processing is an example of processing for accepting an application operation. Hereinafter, an operation for giving an instruction related to a function assigned to an application is referred to as an application operation. Here, the application is an example of software. The application is a control program for realizing a specific function that is inherent in the MFP 10 such as a copy function. The operation for giving an instruction related to a function assigned to an application refers to an operation for instructing the MFP 10 to perform an operation of the control program at a level of each processing.

In a case where a software button is displayed on the LCD panel 202 by the control program, the CPU 101 determines that an application operation has been performed when an operation is performed on the software button. In addition, in a case where the control program accepts an instruction corresponding to an entry of a hardware key such as the numeric keypad 206, the CPU 101 determines that an application operation has been performed when the hardware key via which the control program accepts an instruction is operated. If the CPU 101 determines that the application operation has been performed (YES in step S404), the processing proceeds to step S405. If the CPU 101 determines that no application operation has been performed (NO in step S404), the processing proceeds to step S401.

In step S405, the CPU 101 generates information indicating the content f the application operation accepted in step S404 as an application operation log. The application operation log is information indicating processing setting or the like for each processing execution for which the application determines an operation of the user. In step S406, the CPU 101 records the application operation log generated in step S405 in association with the hardware operation log recorded in the storage unit in step S403. When a plurality of application operations is performed successively a plurality of times, the CPU 101 records each application operation in the storage unit in a way that the order of occurrence can be identified.

In step S407, the CPU 101 determines whether the instruction content is identified based on the hardware operation log recorded in step S403 and the order of occurrence of one or a plurality of application operation logs associated with the hardware operation log in step S406. Here, the instruction content is, for example, 2-in-one printing for the copy function. In other words, the instruction content is information indicating the content of an instruction such as execution or stop of the application.

The MFP 10 associates the instruction content accepted by the application with a reference operation pattern indicating a user operation for setting the instruction content, and store the instruction content and the reference operation pattern. For example, in association with 2-in-one printing, the following pattern of a series of operations is stored as a reference operation pattern.

Select the N-in-one printing button 302 on the copy screen 300 illustrated in FIG. 3.

Then select the 2-in-one printing button 312 on the displayed N-in-one printing screen 310.

Then select the OK button 316.

The CPU 101 compares the order of occurrence of the hardware operation logs and the software operation logs with each reference operation pattern. When a hardware Operation log or a software operation log matches any of the reference operation patterns, the CPU 101 identifies the instruction content corresponding to the matched reference operation pattern as the instruction content set by the user operation. If an instruction content is identified (YES in step S407), the processing proceeds to step S408, if an instruction content is not identified (NO in step S407), the processing proceeds to step S401. The processing of step S407 is an example of processing for identifying an instruction content.

In step S408, the CPU 101 generates an instruction content log indicating the identified instruction content. In step S409, the CPU 101 records the instruction content log in association with the application operation log that matches the reference operation pattern of the instruction content log. The processing then proceeds to step S401, FIG. 5 is a diagram illustrating an example of a data structure of hardware operation logs, application operation logs, and instruction content logs recorded as log information. Hardware operation logs 500 include logs each generated when physical hardware such as the touch panel 201 or the hardware keys 203 to 208 in the operation unit 110 is operated. A hardware operation No. is identification information of each operation log in the hardware operation logs. The hardware operation No. is constituted by a prefix indicating that it is a hardware operation log and a serial number, which is a consecutive value. However, this format s not necessary.

A date and time are a date and time when the operation on the hardware was performed by a user. A hardware operation ID is identification information of a type of a hardware operation. For example, "touchdown" is recorded when a user touches the touch panel, "touchup" is recorded when a finger or the like is released from the touch panel, "keydown" is recorded when the hardware key is pressed, and "keyup" is recorded when the hardware key is released.

Additional information is information for a hardware operation. For example, in a case of operation on the touch panel, information of XY coordinates of the operated touch panel is recorded, and in a case of operation on a hardware key, an ID for identifying the operated hardware key is recorded. When a user operates hardware of the operation unit 110, the hardware operation No., the date and time, the hardware operation ID, and the additional information are stored as one record in the hardware operation logs 500.

An application operation No. in application operation logs 510 is identification information of each operation log in the application operation logs. Similarly to the hardware operation log, an application operation log is constituted by a prefix indicating that it is an application operation log and a serial number which is a consecutive value. However, this format is not necessary. A date and time are the date and time when an operation of application-level was performed.

An application operation ID is identification information of a type of an application operation. For example, when the N-in-one printing button 302 is selected on the copy screen 300, an ID "ID_BTN_NUP" for uniquely identifying the N-in-one printing selection button as a software button is recorded as the application operation ID. Similarly, when the 2-in-one button 312 or the OK button 316 is selected on the N-in-one printing screen 310, "ID_BTN_2IN1" or "ID_BTN_OK" are recorded respectively as the application operation ID. When the start key 203 is pressed while the copy screen 300 for the copy function is displayed, it is determined that the execution of a copy job is started, and the application operation ID "ID_KEY_START" is recorded.

Additional information indicates information for an application-level operation. For example, for an operation on a software button or a hardware key, an identifier indicating whether a button or key is selected and an identifier indicating whether a special selection operation such as double click has been made are recorded. A hardware operation No. is a hardware operation No. that identifies a hardware operation that has caused the application-level operation. For example, the application operation log of "AP00001" indicates that the application operation is caused by hardware operation "HD00001" and hardware operation "HD00002". This indicates that it is determined that the software button "ID_BTN_NUP" is selected by "HD00001" and "HD00002" which are the operations on the touch panel 201, and the application operation "AP00001" is recorded as a log. When the application-level operation is performed in this manner, the application operation No., the date and time, the application operation ID, and the additional information are recorded and stored as one record in the application operation logs 510.

An application-level operation is caused by an operation on hardware. Thus, an application operation log is normally recorded in association with a hardware operation log.

However, if an operation on the application is invalid, an application-level operation log is not recorded. For example, when an operation is performed on the touch panel 201, if there is no operation object such as a software button on the screen corresponding to the operated position, the operation is determined to be invalid and the application operation log corresponding to this operation is not recorded. In addition, when a disabled software button for some reason is chosen, or when the hardware numeric keypad is chosen while an operation screen does not accept a numerical value entry, an application operation log is not recorded. Therefore, a hardware operation log is recorded, but an application operation log corresponding to the hardware operation log is not recorded. This occurs when a user mistakenly selects an area where any button is not displayed, or when a user selects a button without noticing that the button is disabled, or the like. That is, from the fact that any application operation log is not recorded in association with a hardware operation log, it can be estimated that an operation mistake of a user is highly likely to be made and that the operation screen is difficult to operate or difficult to understand for a user.

Instruction content logs 520 illustrate instructions set by user operations. An instruction content No. is an identifier that identifies each of the instruction content logs. Similarly to the hardware operation log and the application operation log, an instruction content log 520 is constituted by a prefix indicating that it is an instruction content log 520 and a serial number that is a consecutive value. However, it does not have to have this type of format. A date and time are the date and time when the pattern matching and a user intention have been detected. An instruction content ID is identification information of a type of an instruction content. For example, in a case where an instruction content is "setting of the N-in-one printing function", an instruction content ID "ID_FNC_NUP" is recorded. When an instruction content is "start of processing of a copy job", an instruction content ID "ID_FNC_START_COPY" is recorded.

An application operation No. is an application operation No. of an application operation corresponding to a reference operation pattern based on which the instruction setting is identified. For example, the instruction content of the instruction content ID "MN00001" indicates that it is based on the application operations having the identifiers "AP00001", "AP00002", and "AP00003".

As described above, in the hardware operation logs, the application operation logs, and the instruction content logs, the MFP 10 stores a hardware operation log, an application operation performed subsequent to the hardware operation log, and an instruction content indicated by the hardware operation and application operation in association with each other. Therefore, it is possible to easily detect an index of the operability and the usability of the operation screen based on the correspondence relationship between hardware operations, application operations, and instruction contents.

As an example, referring to the log information (hardware operation logs, application operation logs, and instruction content logs) recorded by the log recording processing described with reference to FIG. 4, analysis of the operability regarding the N-in-one printing screen 310 illustrated in FIG. 3 will be described. It is obvious that a user has set, as an instruction content, setting of a specific function such as the N-in-one printing function or the like by searching the instruction content logs. In order to do that, the instruction content logs 520 illustrated in FIG. 5 has only has to be searched for the instruction content ID "ID_FNC_NUP" corresponding to the setting of the N-in-one printing function. The instruction content ID does not depend on the device type, the hardware configuration, the type of the application program, or the like. Therefore, even instruction content logs output by devices of different types can be searched by a similar operation method. This makes it easy to compare setting contents between different device types.

By searching the instruction content logs 520 for the instruction content ID "ID_FNC_NUP", it is possible to identify an instruction content No. "MN00001" corresponding to the N-in-one printing function. In addition, it is obvious that the application operation Nos. associated with "M100001" are the following three Nos. of "AP00001", "AP00002", and "AP00003", By searching the application operation logs 510 for these three identifiers, it is possible to identify a hardware operation No. associated with these three identifiers. In the example of FIG. 5, six hardware operations, "HD00001", "HD00002", "HD00003", "HD00004", "HD00007", and "HD00008" are identified. In other words, setting of the instruction content of the N-in-one printing function by the user has been performed by the above six hardware operations. In this way, from the instruction content logs, it is possible to mechanically derive logs up to the related hardware operation. It is very advantageous when analyzing a large amount of log data accumulated in a server or the like.

Further, by deriving a hardware operation from the corresponding instruction content, it is possible to calculate data which is an index of the operability of the operation screen. For example, it is possible to calculate the accurate time for the operation intended by a user, by sorting related hardware operation logs in chronological order, and by calculating the difference between the first log and the last log. Further, in a case where a hardware operation log that is not associated with any of the application operation logs is present in the hardware operation logs sorted in chronological order, it can be considered that a user operation mistake has occurred.

In the example of the logs illustrated in FIG. 5, there are hardware operation logs "HD00005" and "HD00006" that are not associated with any of the application operation logs between hardware operation logs "HD00004" and "HD00007". This means that although hardware is operated, no application-level operation is not determined to be performed. This may include a case where an area other than software buttons displayed on the LCD panel 202 is mistakenly operated, or a software button or a hardware key that is disabled at the application level is selected, for example. A software button or a hardware key is disabled when unacceptable combination of settings is made, or another job is executed, for example. When such operation mistake occurs very often, it is considered that there is a problem with operability, for example, because the size, shape, or the like of a button physically makes operation difficult or it is difficult for a user to see that the operation is disabled. Thus, a hardware operation log that is not associated with any application operation log can be regarded as an index for operability comparison.

Also, when it can be seen from the hardware operation logs that one hardware key is operated many times at very short intervals, it is considered that the hardware key is hit repeatedly. Thus, a situation where the user is impatient or angry can be surmised. Furthermore, when the operation interval between depressing and releasing the touch panel or the hardware key is long at a specific location, it is surmised that a user is feeling anxiety or unsure about the operation. As described above, estimation of situations such as impatience and anxiety in a user operation such as a specific function setting can provide an index for measuring the operability of the operation screen in the function setting.

As described above, the MFP 10 according to the first exemplary embodiment can record an instruction content identified according to a user operation, an application operation log, and a hardware operation log in association with each other. Thus, the MFP 10 can record log information suitable for analyzing operability.

Next, an MFP 10 according to a second exemplary embodiment will be described by mainly describing a difference from the MFP 10 according to the first exemplary embodiment. The MFP 10 according to the second exemplary embodiment also records user information and display screen information as log information in association with the log information described in the first exemplary embodiment.

Figure 6:
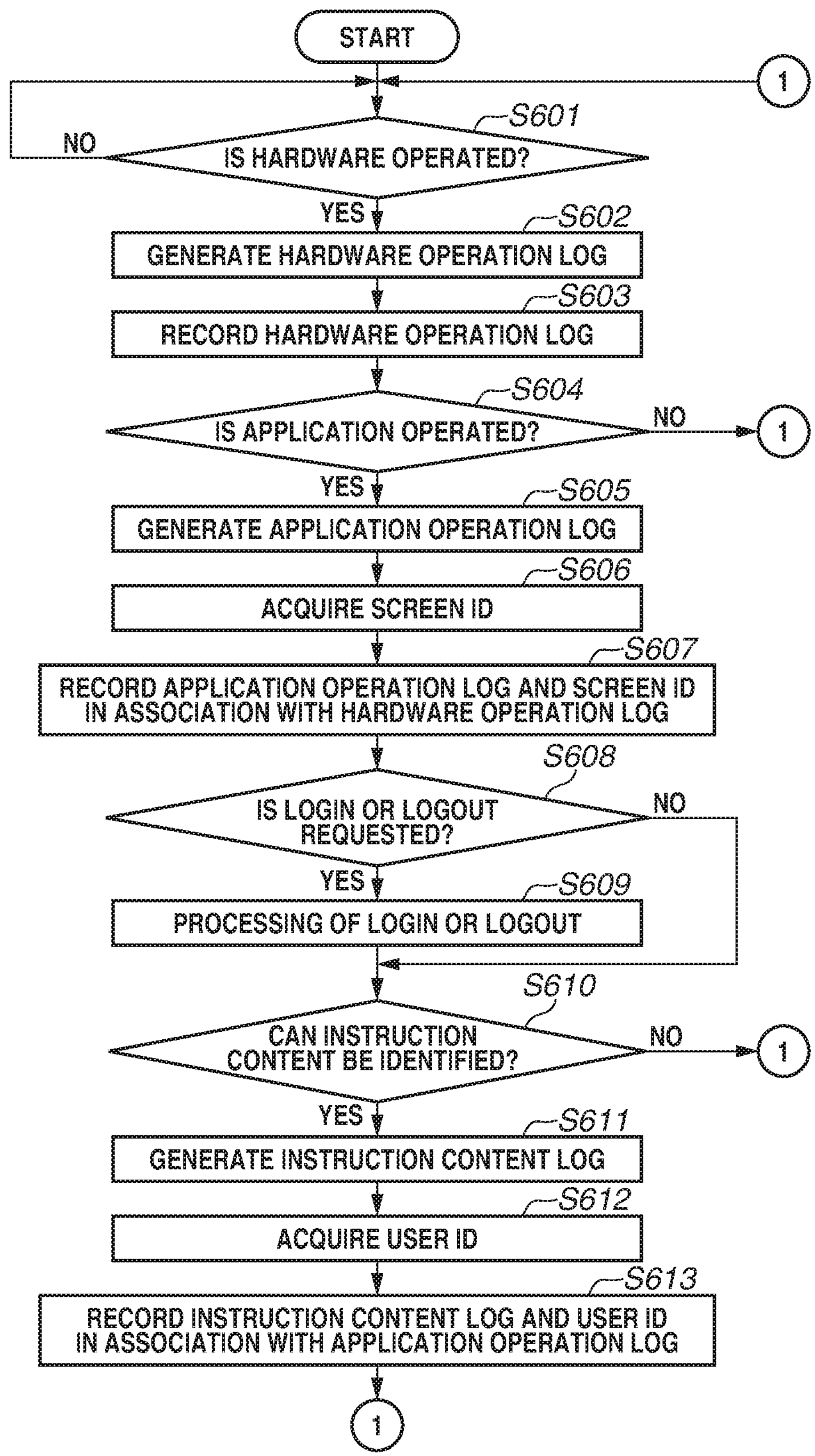
FIG. 6 is a flowchart illustrating log recording processing in accordance with one embodiment.

FIG. 6 is a flowchart illustrating the log recording processing executed by the MFP 10 according to the second exemplary embodiment. The processing of steps S601 to S605 is similar to the processing of steps S401 to S405 described with reference to FIG. 4. After the processing in step S605, in step S606, a CPU 101 identifies a display screen being displayed at the time of the processing and acquires a screen ID of the identified screen. The screen ID is information for uniquely identifying a dialog screen such as the dialog 301 of the copy screen 300 and the dialog 311 of the N-in-one printing screen 310 illustrated in FIG. 3, for example. The CPU 101 acquires the screen ID from a control program such as a copy function control application. The processing in step S606 is an example of processing for identifying a display screen displayed in response to an application operation.

In step S607, the CPU 101 records the application operation log generated in step S605 and the screen ID acquired in step S606 in association with a hardware operation log recorded in step S603. In step S608, the CPU 101 determines whether the application operation is a login request or a logout request of a user. If the CPU 101 determines that the application operation is a login request or a logout request (YES in step S608), the processing proceeds to step S609. If the CPU 101 determines that the application operation is not a login request or a logout request (NO in step S608), the processing proceeds to step S610. In step S609, the CPU 101 performs processing according to the request (login processing or logout processing).

In step S610, the CPU 101 determines whether the instruction content is identified. This processing is similar to the processing of step S407 illustrated in FIG. 4. If the CPU 101 determines that the instruction content is identified (YES in step S610), the processing proceeds to step S611. If the CPU 101 determines that the instruction content is not identified (NO in step S610), the processing proceeds to step S601. In step S611, the CPU 101 generates an instruction content log indicating the instruction content. In step S612, the CPU 101 acquires a user ID that identifies the user who is logging in at the time of processing. Specifically, the CPU 101 acquires a user ID from a control program that manages the login processing. In step S613, the CPU 101 records the instruction content log generated in step S611 and the user ID acquired in step S612 in association with the application operation log recorded in step S607. The processing then proceeds to step S601.

FIG. 7 is a diagram illustrating an example of a data structure of hardware operation logs, application operation logs, and instruction content logs according to the second exemplary embodiment. The data structure of hardware operation logs 700 is similar to that of the hardware operation logs 500 (FIG. 5) according to the first exemplary embodiment. Application operation logs 710 correspond to the application operation logs 510 in FIG. 5, but include an item of a screen ID in addition to the items of the application operation logs 510. Since the application operation logs 710 include the screen ID as described above, it is possible to identify a display screen on which an application-level operation is performed. The instruction content logs 720 correspond to the instruction content logs 520 in FIG. 5, but include an item of a user ID in addition to the items of the instruction content logs 520. Since the instruction content logs 720 include the user ID as described above, it is possible to identify the user who has made the setting and the instruction content which the user has set. The other configuration and processing of the MFP 10 according to the second exemplary embodiment are similar to those of the MFP 10 according to the first exemplary embodiment.

Analysis of the operability with respect the operation screen based on the operation logs is often performed for each display screens. In a case where the operability of a specific function setting is analyzed as intended by a user operation, if there are plural types of screens for setting the function, it is possible to easily calculate an index of the operability for each screen. Thus, it is easy to determine which screen is sophisticated in operability. Further, in a case where one function is set, and a plurality of setting screens is displayed successively, it is easy to calculate data about the operability for each setting screen and determine which screen has low operability.

Furthermore, since user IDs are included in the instruction content logs, when an operation screen on which many operation mistakes have occurred is detected, it is possible to determine whether the operation mistakes are made by a certain user or made evenly by a plurality of users. Thus, it is possible to determine whether the operability of the screen should be modified, or the certain user should be educated on the screen operation, for example. As described above, the MFP 10 according to the second exemplary embodiment can record log information, which allows analysis for each screen and each user.

Although exemplary embodiments of the present disclosure have been described above in detail, the present invention is not limited to the specific exemplary embodiments, and various variations and modifications are possible within the scope of the gist of the present invention described in the claims.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While exemplary embodiments have been described, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-223660, filed Nov. 21, 2017, which is hereby incorporated by reference herein in its entirety.

What is claimed is:

1. An information processing apparatus comprising:
at least one controller configured to perform:
accepting a first operation for giving an instruction related to a function assigned to hardware and a second operation for giving an instruction related to a function assigned to software;
identifying an instruction content corresponding to the first operation and the second operation based on the first operation and the second operation when the second operation is accepted after the first operation is accepted; and
storing, in a storage, the instruction content identified in the identifying, an operation log of the first operation, and an operation log of the second operation in association with each other.

2. The information processing apparatus according to claim 1, wherein the at least one controller is further configured to perform generating the operation log of the first operation when the first operation is accepted, and
wherein when the first operation is accepted, the at least one controller stores the operation log of the first operation in the storage.

3. The information processing apparatus according to claim 2,
wherein the at least one controller generates the operation log of the second operation when the second operation is accepted, and
wherein the at least one controller stores the operation log of the second operation in association with the operation log of the first operation when the second operation is accepted.

4. The information processing apparatus according to claim 3, wherein the at least one controller stores the instruction content in association with the operation log of the second operation in a case where the instruction content is identified.

5. The information processing apparatus according to claim 1, wherein the at least one controller is further configured to perform authenticating a user, and
wherein the at least one controller stores, in the storage, identification information of the user authenticated in association with the instruction content.

6. The information processing apparatus according to claim 3, wherein the at least one controller is further configured to perform identifying a display screen displayed in response to the second operation, and
wherein the at least one controller further stores, in the storage, identification information of the display screen identified in association with the operation log of the second operation.

7. An information processing method executed by an information processing apparatus, the method comprising:
accepting a first operation for giving an instruction related to a function assigned to hardware and a second operation for giving an instruction related to a function assigned to software;
identifying an instruction content corresponding to the first operation and the second operation based on the first operation and the second operation when the second operation is accepted after the first operation is accepted; and
storing, in a storage, the instruction content identified in the identifying, an operation log of the first operation, and an operation log of the second operation in association with each other.

8. The information processing method executed according to claim 7, further comprising:
generating the operation log of the first operation when the first operation is accepted,
wherein when the first operation is accepted, storing the operation log of the first operation in the storage.

9. The information processing method executed according to claim 8, further comprising:
generating the operation log of the second operation when the second operation is accepted, and
storing the operation log of the second operation in association with the operation log of the first operation when the second operation is accepted.

10. The information processing method executed according to claim 9, further comprising:
storing the instruction content in association with the operation log of the second operation in a case where the instruction content is identified.

11. The information processing method executed according to claim 7, further comprising:
authenticating a user; and
storing, in the storage, identification information of the user authenticated in association with the instruction content.

12. The information processing method executed according to claim 9, further comprising:
identifying a display screen displayed in response to the second operation; and
storing, in the storage, identification information of the display screen identified in association with the operation log of the second operation.

13. A non-transitory computer-readable recording medium storing a computer program which, when executed, causes a computer to perform a method for controlling an information processing apparatus, the method comprising:
accepting a first operation for giving an instruction related to a function assigned to hardware and a second operation for giving an instruction related to a function assigned to software;
identifying an instruction content corresponding to the first operation and the second operation based on the first operation and the second operation when the second operation is accepted after the first operation is accepted; and
storing, in a storage, the instruction content identified in the identifying, an operation log of the first operation, and an operation log of the second operation in association with each other.

14. An information processing method executed by an information processing apparatus, the method comprising:

receiving a plurality of touch operations;

accepting a designation of a soft key corresponding to an instruction content; and storing, in a storage, identification information of the soft key in association with information of one or more touch operations related to the designation among the plurality of touch operations, according to the accepting of the designation of the soft key.

15. The information processing method executed according to claim 14, further comprising:

generating a first type operation log of one touch operation when the one touch operation is received, wherein when the one touch operation is received, storing the first type operation log of the one touch operation in the storage.

16. The information processing method executed according to claim 15, further comprising:

generating a second type operation log of the designation of the soft key when the designation of the soft key is accepted, and wherein when the soft key is designated, storing the second type operation log of the designation of the soft key in the storage.

17. The information processing method executed according to claim 16, further comprising:

storing the instruction content in association with the second type operation log of the designation of the soft key in a case where the instruction content is identified.

18. The information processing method executed according to claim 14, further comprising:

authenticating a user; and storing, in the storage, identification information of the user authenticated in association with the instruction content.

19. The information processing method executed according to claim 14, further comprising:

identifying a display screen displayed in response to the designation for the soft key; and storing, in the storage, identification information of the display screen identified in association with the identification information of the soft key.

* * * * *